US005150229A

United States Patent [19]

Takesue et al.

[11] Patent Number: 5,150,229

[45] Date of Patent: Sep. 22, 1992

[54] OPTICAL CORRELATOR

[75] Inventors: Toshiharu Takesue; Yasuyuki Mitsuoka, both of Tokyo, Japan

[73] Assignee: Seiko Instruments Inc., Japan

[21] Appl. No.: 404,325

[22] Filed: Sep. 7, 1989

[30] Foreign Application Priority Data

Sep. 7, 1988 [JP] Japan ................................ 63-227673

[51] Int. Cl.[5] .......................... G03H 1/16; G06G 9/00

[52] U.S. Cl. ........................................... 359/7; 359/29; 359/559; 359/561; 364/822; 382/31

[58] Field of Search ................. 350/3.64, 3.77, 162.12, 350/162.13, 162.14; 364/713, 768, 728.03, 822; 359/7, 29, 559, 560, 561; 382/31

[56] References Cited

U.S. PATENT DOCUMENTS

| | | | |
|---|---|---|---|
| 4,111,526 | 9/1978 | Joseph | 350/162.13 |
| 4,212,536 | 7/1980 | Bencze et al. | 350/3.77 |
| 4,383,734 | 5/1983 | Huignard et al. | 350/162.13 |
| 4,514,038 | 4/1985 | Pichon et al. | 350/162.13 |
| 4,674,824 | 6/1987 | Goodman et al. | 350/3.64 |
| 4,695,973 | 9/1987 | Yu | 350/162.13 |
| 4,715,683 | 12/1987 | Gregory et al. | 350/162.13 |

FOREIGN PATENT DOCUMENTS

| | | |
|---|---|---|
| 57-138616 | 8/1982 | Japan . |
| 57-210316 | 12/1982 | Japan . |
| 58-21716 | 2/1983 | Japan . |

OTHER PUBLICATIONS

Yeh et al, "Real-Time Optical Image Subtraction Using Dynamic Holographic Interference In Photorefractive Media," *Optics Letters*, vol. 13, No. 7, Jul. 1988, pp. 586–588.

Optical Engineering, May 1988, vol. 27, No. 5, "Nonlinear optical image subtraction for potential industrial applications", Chiou et al., pp. 385–392.

*Primary Examiner*—Rodney B. Bovernick
*Assistant Examiner*—Martin Lerner
*Attorney, Agent, or Firm*—Bruce L. Adams; Van C. Wilks

[57] ABSTRACT

An optical correlator according to the present invention generates a cross-correlation peak of two patterns of pictorial information to be compared. It generates pictorial patterns of a sum of the two patterns of pictorial information and of a difference between the two patterns of pictorial information by a phase conjugate waveform, transforms the pictorial patterns into first Fourier transform images, generates a pictorial pattern of a difference between an intensity distribution of the first Fourier transform images by the phase conjugate waveform, and transforms the pictorial pattern of a difference between an intensity distribution of the first Fourier transform images into second Fourier transform images. The optical correlator detects a cross-correlation peak of the two patterns of pictorial information for comparison at a high S/N ratio.

15 Claims, 1 Drawing Sheet

OPTICAL CORRELATOR

BACKGROUND OF THE INVENTION

1. Field of the Invention

The present invention relates to an optical correlator utilized for photometry, optical information processing and the like. More particularly, the present invention relates to an optical correlator which identifies a target object automatically from among two-dimensional images through a coherent optical correlation process.

2. Description of the Prior Art

Various types of optical correlators are known.

One type of optical correlator utilizes a method for making a correlation filter by means of holography for detecting correlation. However, the method requires holograms which make use of Fourier transform patterns for comparison of specifically prepared images which is time consuming and since a pertinent space modulator is not provided for the holograms of the prior art, the holography utilizes a method for recording images lacking in real time efficiency.

Therefore, K. Kasahara, Japanese Patent Laid-Open Nos. 138616/1982, 210316/1982, 21716/1982, discloses an optical correlator utilizing a method for transforming two coherent images into first Fourier transform images through a Fourier transform lens, transforming first Fourier transform images into second Fourier transform images through a Fourier transform lens again, and generating a self-correlation peak and a cross-correlation. The optical correlator is realized with a quasi-real time operation by using a liquid crystal display device for forming two pictorial information sets for comparison with one another however, the two compared images or sets must be spaced apart substantially, thus the operation requires a large optical system or resolution decreases. Further, in case one of the two compared images moves relative to the other, the prior art optical correlation has an extremely narrow field of view and is not operable for minute positioning.

SUMMARY OF THE INVENTION

An object of the present invention is to provide an optical correlator which erases a self-correlation peak of two images to be compared and detects only a cross-correlation peak of the two images to be compared at a high S/N ratio.

Another object of the present invention is to provide an optical correlator which precisely indicates a positional relationship of the two images without depending on a positional relationship of input images.

A further object of the present invention is to provide an optical correlator which is stable against disturbance such as noise so that errors are prevented.

To realize the above objects, the optical correlator of the present invention has first transforming means for transforming two sets or patterns of pictorial information to be compared into coherent images, first generating means for generating a phase conjugate waveform, second generating means for generating pictorial patterns of a sum of the two patterns of pictorial information and a difference between the two patterns of pictorial information, second transforming means for transforming the pictorial patterns into Fourier transform images, and shifting means for shifting pictorial patterns of Fourier transform images to the first transforming means.

DESCRIPTION OF THE PREFERRED EMBODIMENT

The present invention will now be described in detail with reference to its embodiments.

Figure 1:
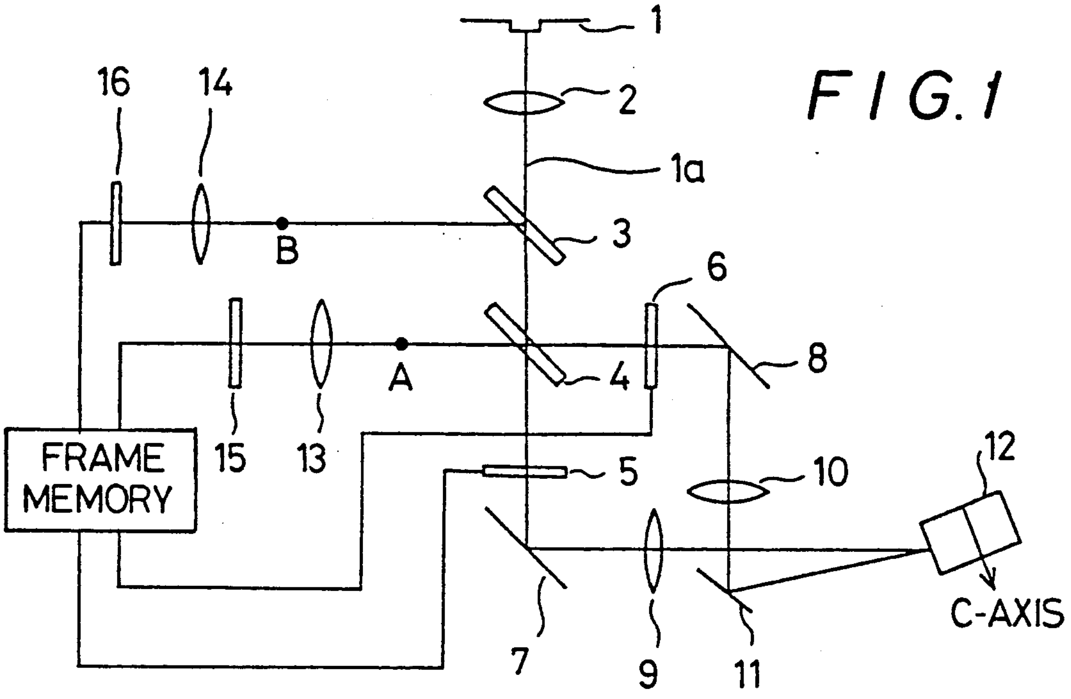
FIG. 1 is an illustration representing one embodiment of an optical correlator according to the present invention.

FIG. 1 is an illustration representing one embodiment of an optical correlator according to the present invention.

A coherent light 1*a* generated by a laser 1 such as argon ion laser or the like is transformed into a parallel light expanded in beam width by a beam expander 2, passes a beam splitter 3, and is incident on a beam splitter 4. In this case, the transmissivity and reflectivity of the beam splitters 3, 4 are 50% each.

The light reflected on the beam splitter 4 passes a space modulator 6 such as a liquid crystal display device or the like for displaying a first input image 6*a* (not shown) thereon. The light is then reflected by a mirror 8, passes a lens 10, is reflected by a mirror 11, and is incident on a non-linear optical crystal 12 such as $BaTiO_3$ or the like. The first input image 6*a* is focused on a surface of the non-linear optical crystal 12.

Furthermore, the light which was passed through the beam splitter 4 passes a space modulator 5 such as a liquid crystal display device or the like for displaying a second input image 5*a* (not shown) thereon, which is placed at a spot equivalent optically to the input image 6*a*, is reflected by a mirror 7, passes a lens 9, and is incident on the non-linear optical crystal 12. The second input image 5*a* is focused on a surface of the non-linear optical crystal 12.

In the case when $BaTiO_3$ is used as the non-linear optical crystal 12, it is desirable that the first input image 6*a* is incident on a face vertical to the C-axis of the $BaTiO_3$ at about 15° and the second input image 5*a* is incident on a face vertical to the C-axis at about 19°.

A phase conjugate waveform generated by the non-linear optical crystal 12 is incident on the beam splitter 4 and the beam splitter 3 through the same route as that for incidence of the coherent light input from opposite sides of the beam splitters 3 and 4. In this case, as disclosed in "Optical Engineering" May 88, Vol. 27 No. 5 385, the light perpendicularly reflected in a direction perpendicular to the incident axis on which it is incident through the space modulator 5 and the light passed axially to the incident axis on which it is incident through the space modulator 6 are focused at a point A which is symmetrical to the point on the space modulator 5 about the normal to the beam splitter 4. And its intensity is as follows;

$$I_A = I_1|E|^2|\sigma|^2RT|T_1(X,Y) - T_2(X,Y)|^2 \quad (1)$$

$T_2(X,Y)$ includes the images which are located at a predetermined distance away from the optical axis and which do not overlap each other on formation of the sum of the images and the difference between the images.

Furthermore, a light which is incident on the beam splitter 3 through the space modulator 5 and the beam splitter 4, and a light which is incident on the beam splitter 3 through the space modulator 6 and the beam splitter 4, are reflected at the beam splitter 3, and are focused at a point B which is symmetrical to the point on the space modulator 5 about the normal to the beam splitter 3. The intensity of this focused light is as follows:

$$I_B = I_1R_1|E|^2|\sigma|^2|TT_1(X, Y) + RT_2(X, Y)|^2 \quad (2)$$

In Eqs. (1) and (2), $I_1$, $R_1$ represent transmissivity and reflectivity of the beam splitter 3 respectively, and T, R represent transmissivity and reflectivity of the beam splitter 4 respectively. Then, $\sigma$ represents a reflection coefficient of a phase conjugate mirror, when the non-linear optical crystal 12 operates as the phase conjugate mirror. E represents an amplitude of the incident light. Further, $T_1$ and $T_2$ represent a transmission distribution of the first and second input images 6a, 5a each.

Now, if transmissivity and reflectivity of the beam splitters 3 and 4 are specified at 50% each, then:

$$I_A = 1/8|E|^2|\sigma|^2|T_1(X, Y) - T_2(X, Y)|^2 \quad (3)$$

$$I_B = 1/16|E|^2|\sigma|^2|T_1(X, Y) + T_2(X, Y)|^2 \quad (4)$$

Thus, the image focused at the point A represents a difference between the first and second input images 6a, 5a, and on the other hand, the image focused at the point B represents a sum of the first and second input images 6a, 5a.

Next, when Fourier transform lenses 13, 14 are disposed at positions where the points A and B become front focal points of the Fourier transform lenses 13, 14, the rear focal planes of the Fourier transform lenses 13, 14 are Fourier transform planes of both the input images. Light receiving elements 15, 16 such as CCD and the like are placed at the positions which are the rear focal planes of the Fourier transform lenses 13, 14, and sensitivities of the light receiving elements are adjusted so to equalize outputs of both light receiving elements 15, 16 when the input is not operative through Fourier transform lenses 13, 14. As a result, intensities on the Fourier transform planes will be:

$$I_A' = \alpha|F(T_1(X, Y) - T_2(X, Y))|^2 \quad (5)$$

$$I_B' = \alpha|F(T_1(X, Y) + T_2(X, Y))|^2 \quad (6)$$

In Eqs. (5) and (6), $\alpha$ represents a proportionality constant, which is decided according to a reflection coefficient of the input light intensity phase conjugate mirror, sensitivity of the light receiving element and so forth.

Next, Fourier transform images received by the light receiving elements 15, 16 are sent to a frame memory 17 of a computer for storage. Then, images formed by intensity patterns of each of the Fourier transform images are again written in the space modulators 5, 6 such as a liquid crystal display device or the like. The subsequent process is as described above and hence is omitted here. Because of the shift invariance of Fourier transformation, the images written in the space modulator 5 and 6 overlap each other centering around the optical axis on formation of the sum of the images and the difference between the images. However, according to the phase conjugate waveform generated by the non-linear optical crystal 12, the difference between Fourier transform images is outputted to the point A with the following intensity:

$$I_A'' = \beta(F(T_1(X, Y)T_2^*(X, Y) + T_1^*(X, Y)T_2(X, Y)) \quad (7)$$

and the sum of Fourier transform images is outputted likewise to the point B with the following intensity:

$$I_B'' = \beta(F(T_1(X, Y)^2 + T_2(X, Y)^2) \quad (8)$$

and then these image are transformed again to Fourier transform images through the Fourier transform lenses 13, 14, therefore outputs of the light receiving elements 15, 16 will have the following intensities:

$$I_A''' \propto T_1(X, Y) \star T_2(X, Y) \quad (9)$$

$$I_B''' \propto T_1(X, Y) \star T_1(X, Y) + T_2(X, Y) \star T_2(X, Y) \quad (10)$$

Here, $\star$ a correlation operation.

Thus, only a cross-correlation peak output is obtainable from the light receiving element 15, and only a self-correlation peak output is obtainable from the light receiving element 16.

Accordingly, the luminous intensity of self-correlation peaks for the first and second input images does not appear at all on the light receiving element 15, therefore, even in case one of the two comparison images moves relative to the other, a cross-correlation peak will never be buried in a self-correlation peak. Thus, a target object can be continually tracked, and absolute position coordinates can be derived for utilization on minute positioning. Then, since noise and other disturbances which are included in Eqs. (5) and (6) concurrently and which are generated by speckle, dust on each element and other contaminants will be erased, an identification error due to generation of a false correlation peak or the like will be prevented, and detection at a high S/N ratio will be realizable.

Figure 2:
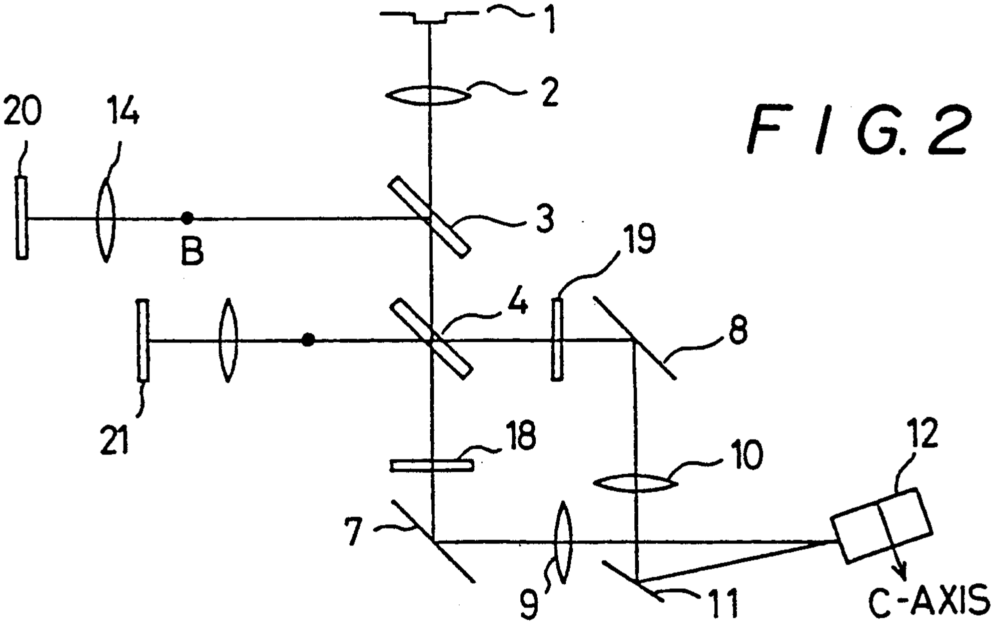
FIG. 2 is an illustration representing another embodiment of an optical correlator according to the present invention.

FIG. 2 is an illustration representing another embodiment of an optical correlator according to the present invention.

The space modulators 5, 6 such as a liquid crystal display device or the like used in the above-described embodiment are substituted by photosensitive films 18, 19 for reproducing input images in the form of transmissivity distributions, and the light receiving elements 15, 16 are substituted by photosensitive films 20, 21 which are capable of reproducing output images in the form of transmissivity distributions. A procedure for obtaining output images is the same as the foregoing embodiment and hence is omitted here. In this case, the photosensitive films 20, 21 upon which output images are reproduced are shifted to substitute light receiving elements 15,16 to accommodate the photosensitive films 18, 19 such that output images are again generated through a procedure similar to that of the foregoing embodiment, thus a self-correlation peak and a cross-correlation peak are generated separately from each other as in the case of the foregoing embodiment. In this case, for example, although a real time efficiency may be lost, information travelling in a special wave envelope will be obtainable by using a plate used in X-ray photography for recording an internal defect of an object or an internal defect of the human body as an input image. Since resolution and contrast ratio of the plate are high normally as compared with the space modulator such as a liquid crystal display device or the like, a correlation of details detected using the latter embodiment can be compared instantly.

As described above, since the optical correlator of the present invention erases self-correlation peaks of input images and detects only cross-correlation peaks of input images without using means such as holography or the like, the optical correlator can track a target object moving arbitrarily at all times, makes use of absolute position coordinates for targeting, and is utilized in minute positioning. Additionally, the optical correlator eliminates noise which is generated by dust and marring of each element, or speckle, and it detects a cross-correlation peak at a high S/N ratio.

What is claimed is:

1. An optical correlator for identifying an object automatically from among two-dimensional images through a coherent optical process, comprising:

means for generating a coherent light;

means for transforming two patterns of pictorial information to be compared into coherent images by said coherent light;

means for generating phase conjugate waveforms of said coherent images;

means for generating pictorial patterns of a sum of said two patterns of pictorial information and of a difference between said two patterns of pictorial information by said phase conjugate waveforms;

means for transforming said pictorial patterns into Fourier transform images individually;

means for receiving said Fourier transform images; and means for transferring output data of said means for receiving said Fourier transform images to said means for transforming said two patterns of pictorial information into said coherent images.

2. An optical correlator according to claim 1; wherein the means for transforming the pictorial patterns into Fourier transform images individually comprises at least one Fourier transform lens.

3. An optical correlator according to claim 1; wherein the means for transforming two patterns of pictorial information to be compared into coherent images by said coherent light comprises at least one liquid crystal display.

4. An optical correlator according to claim 3; wherein the means for generating a phase conjugate waveform comprises a non-linear optical crystal.

5. An optical correlator according to claim 4; wherein the means for receiving the Fourier transform images includes a first light-receiving element, a second light-receiving element and means for detecting a cross-correlation peak obtainable only from the first light-receiving element and a self-correlation peak obtainable only from the second light-receiving element.

6. An optical correlator according to claim 1; wherein the means for receiving said Fourier transform images comprises a charged coupled device.

7. An optical correlator according to claim 1; wherein the means for transforming two patterns of pictorial information to be compared into coherent images by said coherent light comprises at least one photosensitive film.

8. An optical correlator according to claim 7; wherein the means for generating a phase conjugate waveform comprises a non-linear optical crystal.

9. An optical correlator according to claim 8; wherein the means for transforming the pictorial patterns into Fourier transform images individually comprises at least one Fourier transform lens.

10. An optical correlator according to claim 9; wherein the means for receiving the Fourier transform images includes a first light-receiving element, a second light-receiving element and means for detecting a cross-correlation peak obtainable only from the first light-receiving element and a self-correlation peak obtainable only from the second light-receiving element.

11. A method of generating cross-correlation information of two patterns of pictorial information to be compared with one another, the method comprising the steps of:

transforming two patterns of pictorial information to be compared into coherent images;

generating phase conjugate waveforms of the coherent images;

generating pictorial patterns of a sum of the two patterns of pictorial information and of a difference between the two patterns of pictorial information by the phase conjugate waveforms;

transforming the pictorial patterns into Fourier transform images;

generating intensity distribution patterns of the Fourier transform images;

transforming the intensity distribution patterns of the Fourier transform images into coherent images;

generating phase conjugate waveforms of the coherent images which are transformed from said intensity distribution patterns;

generating pictorial patterns of a sum of the coherent images which are transformed from the intensity distribution patterns and of a difference between the coherent images which are transformed from the intensity distribution patterns by the phase conjugate waveforms which are generated from the coherent images being transformed from the intensity distribution patterns;

transforming the sum of the coherent images and the difference between the coherent images into Fourier transform images; and detecting the Fourier transform images transformed from the sum of the coherent images and the difference between the coherent images.

12. An optical correlator, comprising: light means for generating coherent light; transforming means receptive of the coherent light for transforming two sets of pictorial information into coherent images by the coherent light; first generating means for receiving the coherent images and generating corresponding respective phase conjugate waveforms; second generating means respective of the phase conjugate waveforms for generating a sum corresponding to the sets of pictorial information and a difference corresponding to the sets of pictorial information; Fourier transform means for producing corresponding respective Fourier images corresponding to the sets of pictorial information; and receiving means for receiving the Fourier images.

13. An optical correlator according to claim 12, wherein said receiving means comprise photosensitive film.

14. An optical correlator according to claim 12, wherein said first generating means includes a non-liner optical crystal.

15. An optical correlator according to claim 12, wherein said receiving means produces output data; and feed-back means for transferring the output data of said receiving means to said transforming means.

* * * * *